(12) United States Patent
Lin

(10) Patent No.: US 12,487,430 B2
(45) Date of Patent: Dec. 2, 2025

(54) LENS DEVICE

(71) Applicants: Sintai Optical (Shenzhen) Co., Ltd., ShenZhen (CN); Asia Optical Co., Inc., Taichung (TW)

(72) Inventor: Guo-Quan Lin, ShenZhen (CN)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 580 days.

(21) Appl. No.: 17/952,536

(22) Filed: Sep. 26, 2022

(65) Prior Publication Data

US 2023/0097275 A1   Mar. 30, 2023

(30) Foreign Application Priority Data

Sep. 30, 2021 (CN) .......................... 202111166496.6

(51) Int. Cl.
*G02B 7/02* (2021.01)
*G02B 7/04* (2021.01)

(52) U.S. Cl.
CPC ..................................... *G02B 7/04* (2013.01)

(58) Field of Classification Search
CPC .............................................. G02B 7/04–105
USPC .................................. 359/676–706, 822–826
See application file for complete search history.

(56) References Cited

U.S. PATENT DOCUMENTS

| | | | |
|---|---|---|---|
| 5,892,629 A * | 4/1999 | Nishihara | G11B 7/0932 720/682 |
| 6,493,158 B2 | 12/2002 | Suzuki et al. | |
| 7,956,515 B2 | 6/2011 | Honma et al. | |
| 2021/0247605 A1 | 8/2021 | Hu et al. | |
| 2023/0022577 A1 | 1/2023 | Osaka et al. | |

FOREIGN PATENT DOCUMENTS

| | | | |
|---|---|---|---|
| CN | 213423564 U | 6/2021 | |
| JP | 2003185933 A * | 7/2003 | |
| JP | 20163569 A | 3/2016 | |
| JP | 2021105653 A | 7/2021 | |
| JP | 2022138339 A | 9/2022 | |
| TW | I410743 B | 10/2013 | |
| WO | WO-2015118088 A1 * | 8/2015 | B23K 26/04 |

* cited by examiner

*Primary Examiner* — Mahidere S Sahle
(74) *Attorney, Agent, or Firm* — McClure, Qualey & Rodack, LLP

(57) ABSTRACT

A lens device includes a base, a lens module, a driving device, a plurality of positioning elements, a dragging element and a counterweight block. The lens module is disposed in the base and includes at least one movable lens group that is movable in a first direction. The driving device is configured to drive the movable lens group to move. The positioning elements are spaced in the first direction and fixed to the base. The dragging element is put around the positioning elements. The counterweight block and the movable lens group are connected to the dragging element.

19 Claims, 9 Drawing Sheets

LENS DEVICE

BACKGROUND OF THE INVENTION

Field of the Invention

The invention relates to an optical field, and more particularly to a lens device.

Description of the Related Art

FIG. 1 is a schematic diagram showing the structure of a lens device 10 of the prior art. As shown in FIG. 1, the lens device 10 includes a base 11, a first lens group 13, a second lens group 14, a third lens group 15, a fourth lens group 16 and a photosensitive assembly (not shown), wherein the first lens group 13, the second lens group 14, the third lens group 15 and the fourth lens group 16 are disposed on the base 11. Guiding elements 12 are fixed to the base 11. The second lens group 14 and the third lens group 15 are movable along the guiding elements 12 to perform zooming or focusing operation.

The lens device 10 further includes a driving device for driving the second lens group 14 to move. The driving device includes coils (not shown) disposed on the base 11, and magnets 18 disposed on the second lens group 14. A position sensor (not shown) is disposed on the base 11. When power is supplied to the coils, the coils and the magnets interact with each other to move the second lens group 14. The position sensor senses the movement distance and position of the second lens group 14. When reaching the predetermined position, the second lens group 14 stops. The movement of the third lens group 15 is similar to that of the second lens group 14.

The above lens device has the following drawback: in the state shown in FIG. 1, the second lens group 14 and the third lens group 15 are placed horizontally and are moved to perform zooming or focusing operation by electromagnetic forces. However, the second lens group 14 and the guiding elements have gaps therebetween, and the third lens group 15 and the guiding elements also have gaps therebetween. The placement of the guiding elements turns vertical when the lens device is placed vertically. To prevent the second lens group 14 and the third lens group 15 under the gravity force from falling down along the guiding elements 12, continuously supplying power to the coils is required. However, that significantly increases power consumption.

BRIEF SUMMARY OF THE INVENTION

The invention provides a solution to address the described drawbacks. The lens device of the invention is capable of reducing power consumption.

The lens device in accordance with an exemplary embodiment of the invention includes a base, a lens module, a driving device, a plurality of positioning elements, a dragging element and a counterweight block. The lens module is disposed in the base and includes at least one movable lens group that is movable in a first direction. The driving device is configured to drive the movable lens group to move. The positioning elements are spaced in the first direction and fixed to the base. The dragging element is put around the positioning elements. The counterweight block and the movable lens group are connected to the dragging element.

In another exemplary embodiment, the lens device further includes a guiding unit, wherein the guiding unit is disposed on the base in the first direction to guide at least one of the movable lens group and the counterweight block.

In yet another exemplary embodiment, the base includes a side wall. The driving device includes a magnet and a coil. The magnet is fixed to one of the movable lens group and the side wall of the base, and the coil is fixed to the other of the movable lens group and the side wall of the base.

In another exemplary embodiment, the guiding unit includes first guiding units connected to both sides of the base, and the movable lens group is configured to operate with the first guiding units so as to slide.

In yet another exemplary embodiment, the movable lens group includes a connecting portion. The magnet or the coil is fixed to the connecting portion. The connecting portion and the side wall of the base are close to and face each other. The connecting portion is disposed between the counterweight block and the side wall.

In another exemplary embodiment, the movable lens group is fixed to the dragging element through the connecting portion, and the movable lens group and the counterweight block are connected to both sides of the dragging element.

In yet another exemplary embodiment, the connecting portion is flat.

In another exemplary embodiment, the connecting portion includes a first portion and a second portion, the first portion is connected to a side surface of the movable lens group, and the second portion extends from the first portion towards the side wall of the base.

In yet another exemplary embodiment, the base includes a side wall. The driving device includes a magnet and a coil. The magnet is fixed to one of the counterweight block and the side wall of the base, and the coil is fixed to the other of the counterweight block and the side wall of the base.

In another exemplary embodiment, the guiding unit includes a second guiding unit connected to a side of the base. The second guiding unit is penetrated through the counterweight block. The counterweight block is slidable on the second guiding unit.

In yet another exemplary embodiment, the counterweight block and the side wall of the base are close to and face each other, and the counterweight block is disposed between the movable lens group and the side wall.

In another exemplary embodiment, the counterweight block includes a concave portion to which the coil or the magnet is fixed. The concave portion extends in the first direction.

In yet another exemplary embodiment, the counterweight block itself is the coil or the counterweight block itself is the magnet.

In another exemplary embodiment, the lens module includes at least two adjacent movable lens groups. The counterweight blocks corresponding to the adjacent movable lens groups are disposed on both sides of the base.

In yet another exemplary embodiment, the positioning element is a positioning post and the dragging element is a pulling string, or the positioning element is a belt wheel and the dragging element is a belt, or the positioning element is a gear and the dragging element is a chain.

In another exemplary embodiment, a mass of the movable lens group is equal to that of the counterweight block.

Practicing the lens device of the invention has the following merits: when the movable lens device is moved to a predetermined position and stops, the counterweight block and the movable lens group sustain pulling forces from each other through the dragging element thereby significantly reducing the power consumption, even if the whole lens device is placed vertically.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The purpose, technical scheme and merits of the invention can be more fully understood by reading the subsequent detailed description and embodiments with references made to the accompanying drawings. However, it is understood that the subsequent detailed description and embodiments are only used for describing the invention. The invention is not limited thereto.

Figure 1:
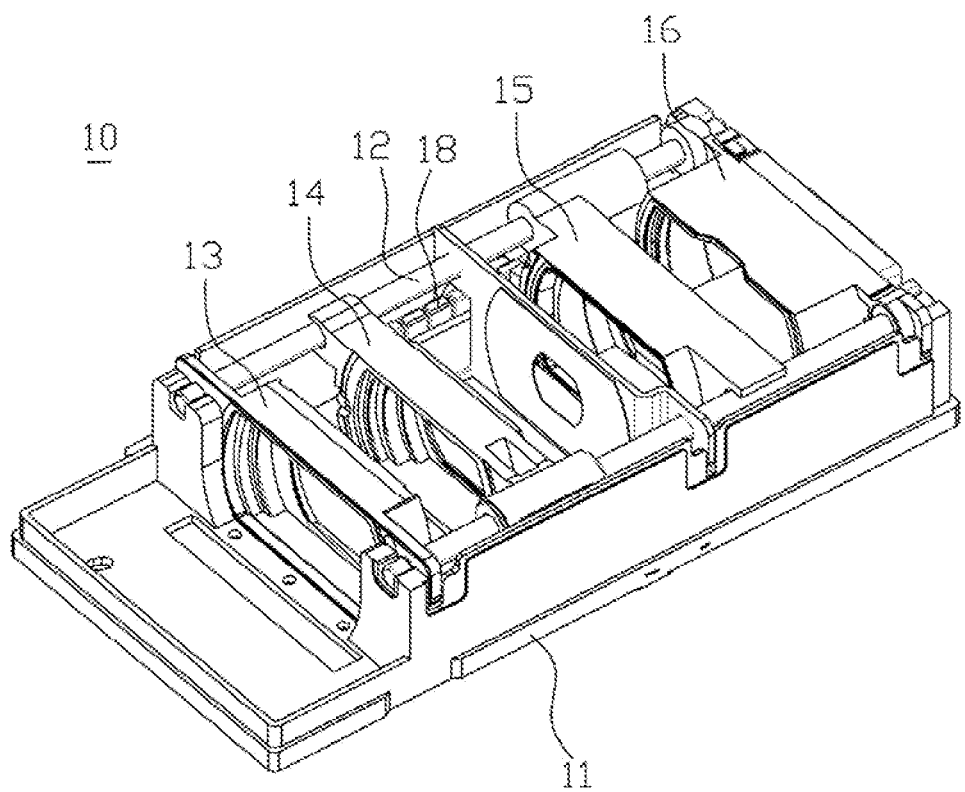
FIG. 1 is a schematic diagram showing the structure of a lens device of the prior art.
Figure 2:
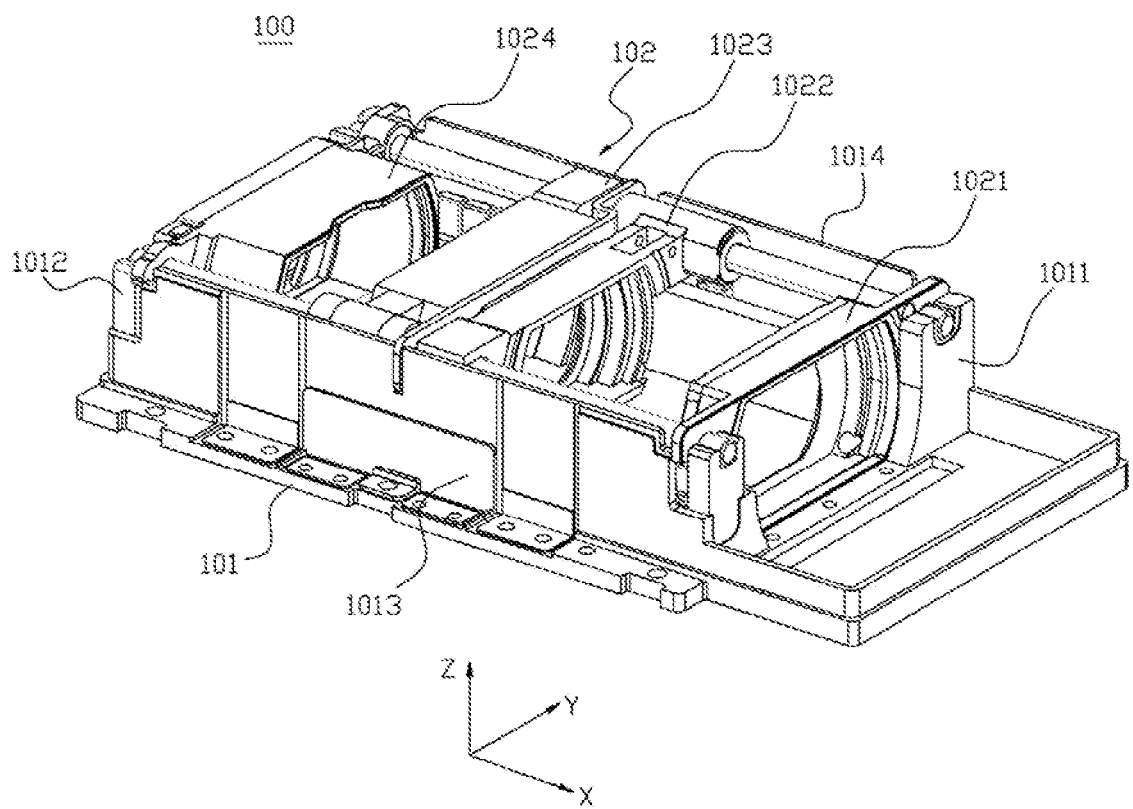
FIG. 2 is a schematic view showing the structure of a lens device in accordance with the first embodiment of the invention.
Figure 3:
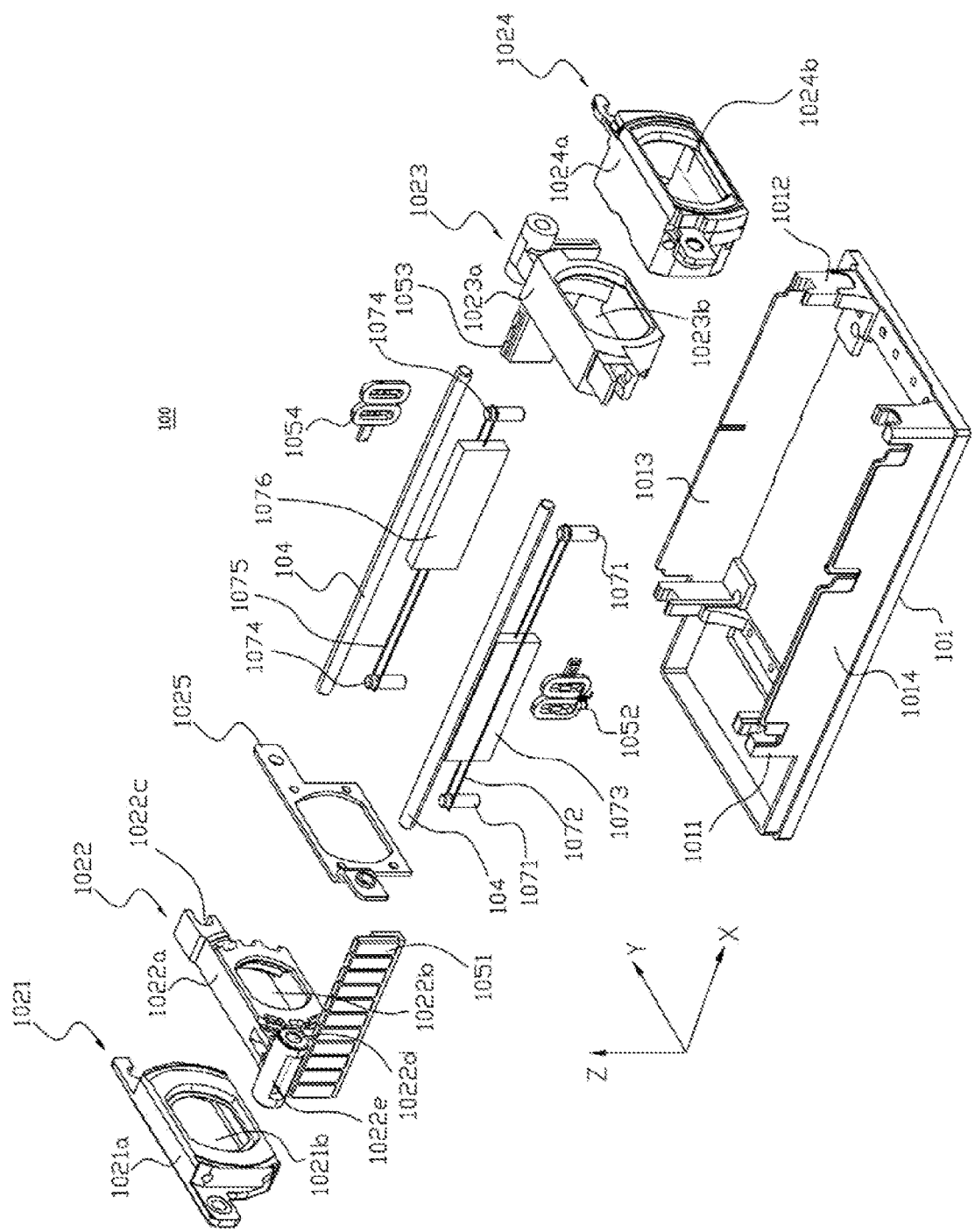
FIG. 3 is an exploded schematic view of the lens device in accordance with the first embodiment of the invention.
Figure 4:
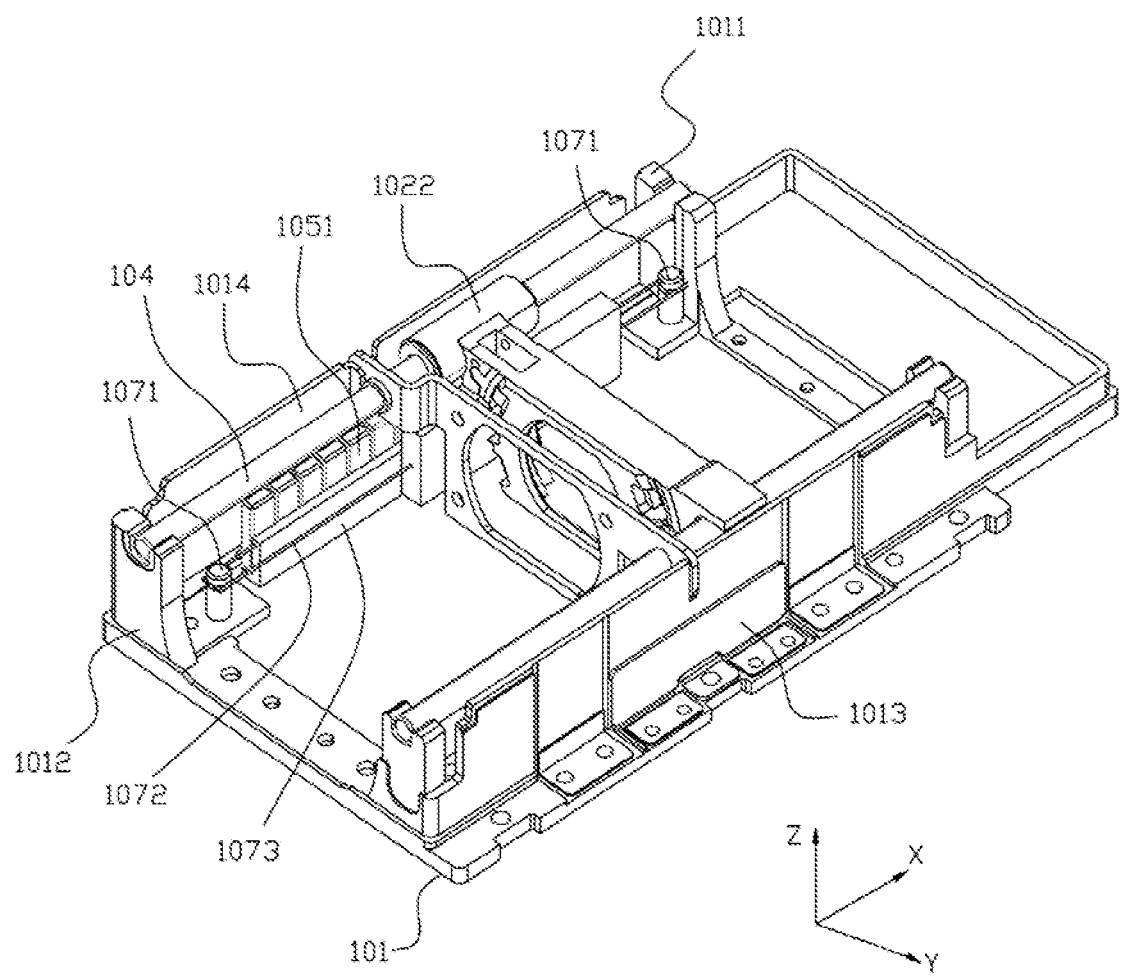
FIG. 4 is a schematic view showing the structure of a base and a second lens group of the lens device in accordance with the first embodiment of the invention.
Figure 5:
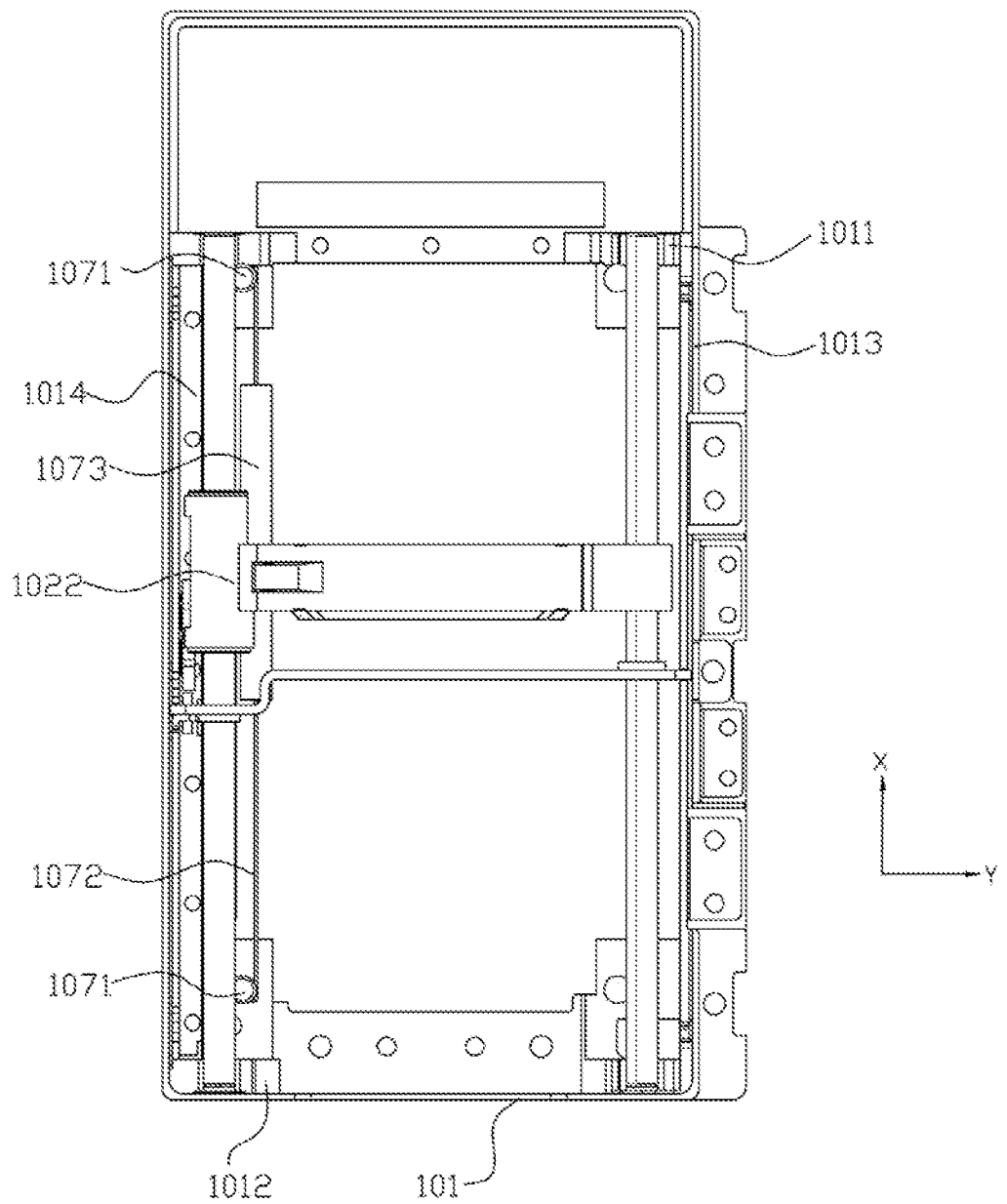
FIG. 5 is a top view of the base and the second lens group of the lens device in accordance with the first embodiment of the invention.

FIG. 2 is a schematic view showing the structure of a lens device 100 in accordance with the first embodiment of the invention. FIG. 3 is an exploded schematic view of the lens device 100 in accordance with the first embodiment of the invention. FIG. 4 is a schematic view showing the structure of a base 101 and a second lens group 1022 of the lens device 100 in accordance with the first embodiment of the invention. FIG. 5 is a top view of the base 101 and the second lens group 1022 of the lens device 100 in accordance with the first embodiment of the invention. As shown in FIGS. 2-5, the lens device 100 of the invention includes a base 101, a light path turning module (not shown), a lens module 102 and an image forming module (not shown). The light path turning module, the lens module 102 and the image forming module are sequentially disposed on the base 101. The lens module 102 has an optical axis extending in a first direction X.

The base 101 includes a first side wall 1011, a second side wall 1012, a third side wall 1013 and a fourth side wall 1014. The first side wall 1011 and the second side wall 1012 are disposed opposite to each other and perpendicular to the first direction X. The third side wall 1013 and the fourth side wall 1014 are disposed opposite to each other and perpendicular to a second direction Y. The first direction X is perpendicular to the second direction Y. The first side wall 1011 and the second side wall 1012 are respectively provided with optical holes allowing light to pass through.

The light path turning module (not shown) is configured to reflect the light coming from a third direction Z to propagate in the first direction X.

The lens module 102 includes a plurality of lens groups wherein at least one lens group is movable along the optical axis extending in the first direction X to perform zooming or focusing operation. Each lens group has a lens frame and one or more lenses fixed to the lens frame. In the embodiment depicted by figures, the lens module 102 includes four lens groups, wherein a first lens group 1021 includes a first lens frame 1021a and one or more first lenses 1021b disposed in the first lens frame 1021a, a second lens group 1022 includes a second lens frame 1022a and one or more second lenses 1022b disposed in the second lens frame 1022a, a third lens group 1023 includes a third lens frame 1023a and one or more third lenses 1023b disposed in the third lens frame 1023a, and a fourth lens group 1024 includes a fourth lens frame 1024a and one or more fourth lenses 1024b disposed in the fourth lens frame 1024a. The lens device 100 further includes an aperture 1025 disposed between the second lens group 1022 and the third lens group 1023. However, the invention is not limited thereto. The aperture 1025 may be disposed between other lens groups or disposed on one lens group.

In this embodiment, the second lens group 1022 and the third lens group 1023 are movable in the first direction X. However, this is only an example for the purpose of descriptions, and the invention is not limited thereto.

A first guiding unit is disposed in the first direction X in the base 101. In this embodiment, the first guiding unit includes at least two guiding rods 104. The two guiding rods 104 are respectively connected to both sides of the upper portions of the first side wall 1011 and the second side wall 1012. The second lens frame 1022a has openings 1022c and holes 1022d on both sides to fit the guiding rods 104, enabling the second lens frame 1022a to slide on the guiding rods 104. The second lens frame 1022a further has a connecting sleeve 1022e on one side and the connecting sleeve 1022e is extended in the first direction X. The above-mentioned hole 1022d is provided in the connecting sleeve 1022e and fits the guiding rod 104. The structure of the third lens frame 1023a is similar to that of the second lens frame 1022a and therefore the descriptions thereof are omitted. The first lens group 1021 and the fourth lens group 1024 may be fixed to the guiding rods 104 or fixed to the base 101.

The lens device 100 further includes a driving device for driving the movable lens group to move in the first direction X and a position sensing device. The driving device includes magnets fixed to one of the movable lens group and the base 101, and coils fixed to the other of the movable lens group and the base 101. The position sensing device includes a position magnet fixed to the movable lens group and a position sensor fixed to the base 101.

In the embodiment depicted by figures, one or more first magnets 1051 are fixed to the side surface of the second lens group 1022. One or more first coils 1052 are fixed to the inner side of one of the third side wall 1013 and the fourth side wall 1014 of the base 101. When there are plural first coils 1052, the first coils 1052 are adjoined or spaced in the first direction X. One or more second magnets 1053 are fixed to the side surface of the third lens group 1023. One or more second coils 1054 are fixed to the inner side of one of the third side wall 1013 and the fourth side wall 1014 of the base 101. When there are plural second coils 1054, the second coils 1054 are adjoined or spaced in the first direction X.

One or more first magnets 1051 are provided on the side surface of the second lens group 1022 that is disposed towards the base 101 and perpendicular to the second direction Y. The first magnet 1051 is a multi-pole magnet having different magnetic poles spaced in the first direction X. For example, the first magnet 1051 has a first magnetic pole and a second magnetic pole which are spaced in the first direction.

One or more second magnets 1053 are provided on the side surface of the third lens group 1023 that is disposed towards the base 101 and perpendicular to the second direction Y. The second magnet 1053 is a multi-pole magnet having different magnetic poles spaced in the first direction X. For example, the second magnet 1053 has a first magnetic pole and a second magnetic pole which are spaced in the first direction.

Further, a first position magnet is fixed to the side surface of the second lens group 1022. The first position magnet may be disposed under the first magnet 1051. First position sensors are fixed to the inner sides of the third side wall 1013 and the fourth side wall 1014 of the base 101. The first position sensors are positioned corresponding to the first position magnet. By such arrangement, the location of the second lens group 1022 can be detected by the first position sensors, the magnitude and/or direction of the electric current passed through the first coils 1052 can be correspondingly changed, the magnitude and/or direction of the electromagnetic force can be correspondingly changed, and then the movement direction and the location of the second lens group 1022 are correspondingly changed. When electric current is passed through the first coils 1052, the first coils 1052 and the first magnet 1051 interact with each other so as to move the second lens group 1022 in the first direction X. The movement and location of the second lens group 1022 are changed until the action forces of the first magnet 1051 applied to the first coils 1052 are in equilibrium. That is, the second lens group 1022 stops moving and stays in the predetermined position. The arrangement and operation of the third lens group are similar to those of the second lens group and therefore the descriptions thereof are omitted.

A second position magnet is fixed to the side surface of the third lens group 1023. The second position magnet may be disposed at the lower portion of the side surface of the third lens group 1023. Corresponding to the second position magnet, second position sensors are fixed to the inner sides of the third side wall 1013 and the fourth side wall 1014 of the base 101. The arrangement of the second position magnet and second position sensors is similar to that of the first position magnet and first position sensors, and therefore the descriptions thereof are omitted.

By way of movements of some of lens groups in the first direction X, the zooming operation or focusing operation of the lens device 100 are performed.

The lens device 100 further includes at least two positioning elements, a dragging element and a counterweight block. The positioning elements are spaced in the first direction X and fixed to the base 101. The dragging element is disposed around the positioning elements. The dragging element connect the movable lens group and the counterweight block so that the movable lens group and the counterweight block have at least one positioning element interposed therebetween. When there are two positioning elements, the movable lens group and the counterweight block are located on two sides of the dragging element. The mass of the counterweight block may be equal to that of the movable lens group.

In the embodiment depicted by figures, two first positioning elements 1071 are fixed to the base 101. The first positioning elements 1071, spaced in the first direction X, are first positioning posts extending in the third direction Z. The first dragging element 1072 is a pulling string that is looped and tensely provided between the first positioning posts 1071. Further, the first dragging element 1072 has two ends put around the first positioning elements 1071 and two sides extending in the first direction X. The first counterweight block 1073 and the second lens group 1022 are respectively connected to the two sides of the first dragging element 1072. The mass of the first counterweight block 1073 is equal to that of the second lens group 1022.

The first positioning element 1071 and the first dragging element 1072 may be practiced in other ways. For example, the first positioning element 1071 is a belt wheel having its axis extending in the third direction Z, and the first dragging element 1072 is a belt put around the belt wheel. For another example, the first positioning element 1071 is a gear having its axis extending in the third direction Z, and the first dragging element 1072 is a chain put around and engaged with the gear.

When moving to the predetermined location, the second lens group 1022 stops. Power supplied to the first coil 1052 is cut off so that the electromagnetic force applied to the second lens group 1022 disappears. The first counterweight block 1073 and the second lens group 1022 sustain pulling forces from each other through the first dragging element 1072, and the pulling forces are equal to the gravity of the counterweight block 1073 and the gravity of the second lens group 1022. Therefore, the second lens group 1022 is kept stationary without falling down because of the equilibrium of the pulling force and the gravity, even when the lens device 100 is placed vertically (i.e. the first direction X is now the gravity direction). Because continuously supplying power to the first coil 1052 is not required, power consumption is significantly reduced.

If the mass of the first counterweight block 1073 is not equal to that of the second lens group 1022, then the equilibrium of the pulling force and the gravity can be still achieved by less electromagnetic force generated by the first coil 1052 and the first magnet 1051 because the first counterweight block 1073 under the gravity keeps pulling the second lens group 1022. That is, supplying power to the first coil 1052 to totally counter the gravity of the second lens group 1022 is not required. Therefore, power consumption can be still significantly reduced.

Figure 6:
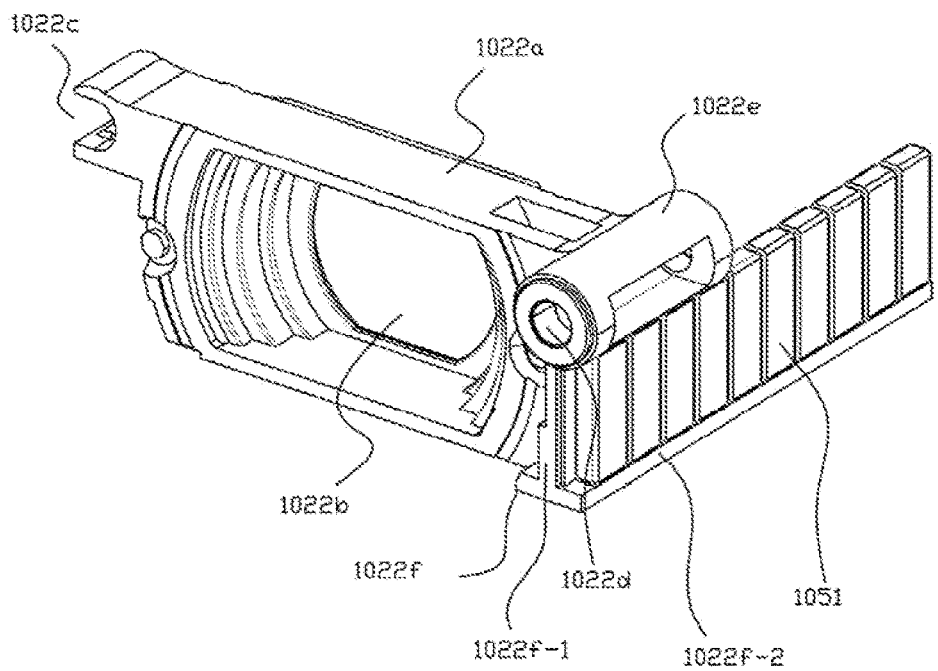
FIG. 6 is a schematic view showing the structure of a second lens group of the lens device in accordance with the first embodiment of the invention.
Figure 7:
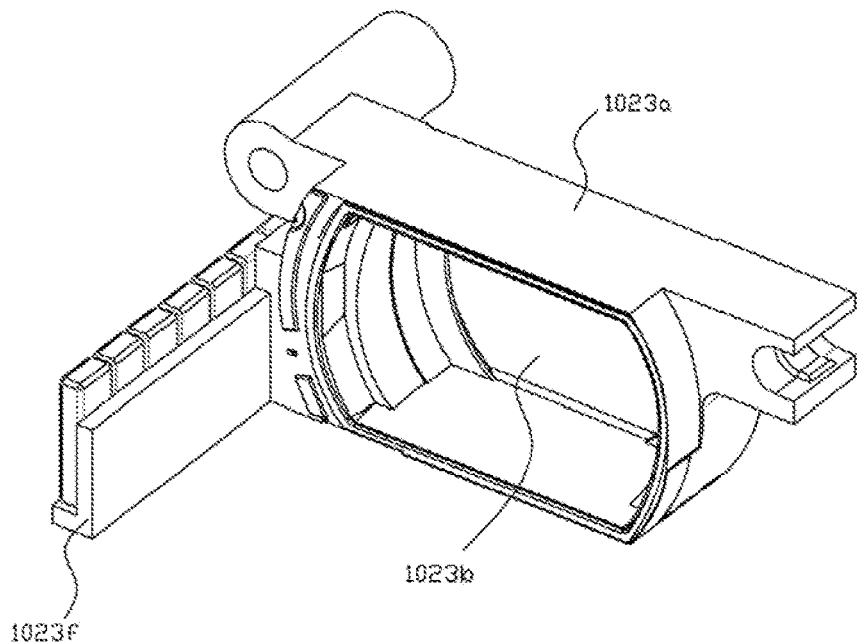
FIG. 7 is a schematic view showing the structure of a third lens group of the lens device in accordance with the first embodiment of the invention.

Also shown in FIG. 6, FIG. 6 is a schematic view showing the structure of the second lens group 1022 of the lens device in accordance with the first embodiment of the invention. The first positioning element 1071 is disposed near one of the third side wall 1013 and the fourth side wall 1014 of the base 101. The second lens group 1022 has a first connecting portion 1022f disposed corresponding to the first counterweight block 1073 and under the opening 1022c or the hole 1022d that fits the guiding rod 104. The second lens group 1022 is connected to the first dragging element 1072 through the first connecting portion 1022f. However, the invention is not limited thereto. The outer circumference of the second lens group 1022 may be directly connected to the first dragging element 1072 and has the first connecting portion 1022f to mount the first magnet 1051 or the first coil 1052.

The first connecting portion 1022f may extend from the side surface of the second lens group 1022 in the first direction X. Further, the first connecting portion 1022f may be flat and be integrally formed with the side surface of the second lens frame 1022a. The first magnet 1051 or the first coil 1052 is fixed to the first connecting portion 1022f. The first connecting portion 1022f may be perpendicular to the second direction Y. The first connecting portion 1022f may have a concave portion for correspondingly mounting the first magnet 1051 or the first coil 1052.

To guarantee an effective interaction between the first magnet 1051 and the first coil 1052, the first connecting portion 1022f is disposed near the one of the third side wall 1013 and the fourth side wall 1014, wherein the first connecting portion 1022f and the one of the third side wall 1013 and the fourth side wall 1014 are disposed to face each other. Also, the first connecting portion 1022f is disposed between the corresponding first counterweight block 1073 and the one of the third side wall 1013 and the fourth side wall 1014.

Optionally, the first connecting portion 1022f includes a first portion 1022f-1 connected to the side surface of the second lens frame 1022a, and a second portion 1022f-2 extending from the first portion 1022f-1 towards the base 101. From the figures, it can be seen that the first portion 1022f-1 is in a plane containing the first direction X and the third direction Z. The second portion 1022f-2 is in a plane containing the first direction X and the second direction Y.

One of the first magnet 1051 and the first coil 1052 is fixed to the first connecting portion 1022f, while the other of the first magnet 1051 and the first coil 1052 is fixed to the base 101. The first magnet 1051 and the first coil 1052 are disposed corresponding to each other.

In the embodiment depicted by figures, an end of the first connecting portion 1022 is fixed to the second lens frame 1022a. Specifically, the first portion 1022f-1 of the first connecting portion 1022f has an end fixed to the second lens frame 1022a. It is optional that the first connecting portion 1022f has a middle portion (not an end) fixed to the second lens frame 1022a.

The third lens group 1023 is similar to the second lens group 1022. As shown in FIGS. 2-5 and 7, the base 101 has two second positioning elements 1074 fixed thereto. The second positioning elements 1074 are spaced in the first direction X. The second dragging element 1075 has two ends put around the second positioning elements 1074. The second counterweight 1076 and the third lens group 1023 are respectively connected to the two sides of the second dragging element 1075. The mass of the second counterweight block 1076 is equal to that of the third lens group 1023. The third lens group 1023 has a second connecting portion 1023f. All the structure is the same as that described above. For simplification, the descriptions are omitted. It is understood that there are two first positioning elements 1071 and two second positioning elements 1074 in this embodiment. However, the invention is not limited thereto. The number of first positioning elements 1071 and second positioning elements 1074 can be increased, if it is required.

The first connecting portion 1022f may be disposed on a side surface of the second lens frame 1022a opposite to the third side wall 1013 or on another side surface of the second lens frame 1022a opposite to the fourth side wall 1014. Alternatively, two first connecting portions 1022f are disposed on two side surfaces of the second lens frame 1022a opposite to the third side wall 1013 and the fourth side wall 1014. The second connecting portion 1023f is similar to the first connecting portion 1022f.

Preferably, the first connecting portion 1022f of the second lens group 1022 is disposed corresponding to one of the third side wall 1013 and the fourth side wall 1014, and the second connecting portion 1023f of the third lens group 1023 is disposed corresponding to the other of the third side wall 1013 and the fourth side wall 1014. By such arrangement, interference between the first connecting portion 1022f of the second lens group 1022 and the second connecting portion 1023f of the third lens group 1023 in movement can be avoided, and the volume of the lens device can be reduced as much as possible. The first counterweight block 1073 and the second counterweight block 1076 are disposed on two sides of the base 101.

In this embodiment, the first counterweight block 1073 and the second counterweight block 1076 may be made of metal, for example, iron, copper, aluminum or the like, so that the first counterweight block 1073 and the second counterweight block 1076 can have less volume and larger mass to counter the mass of the second lens group 1022 and the third lens group 1023.

Figure 8:
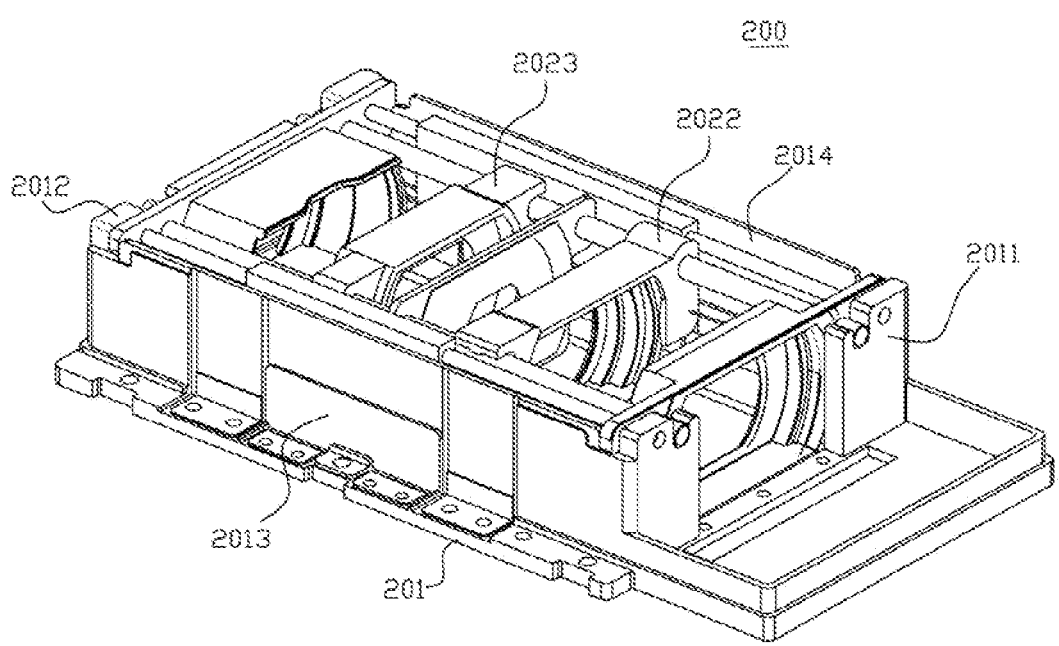
FIG. 8 is a schematic view showing the structure of the lens device in accordance with the second embodiment of the invention.
Figure 9:
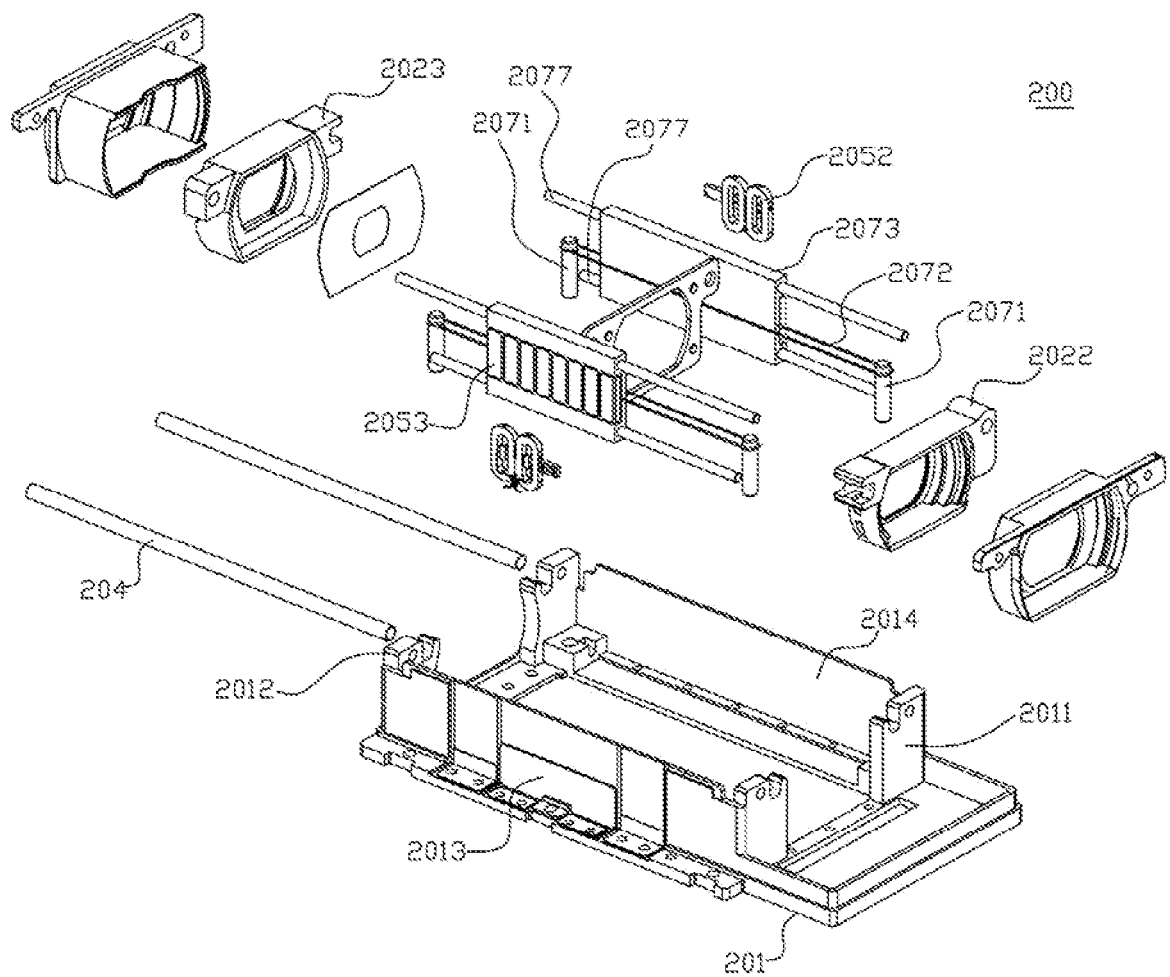
FIG. 9 is an exploded schematic view of the lens device in accordance with the second embodiment of the invention.
Figure 10:
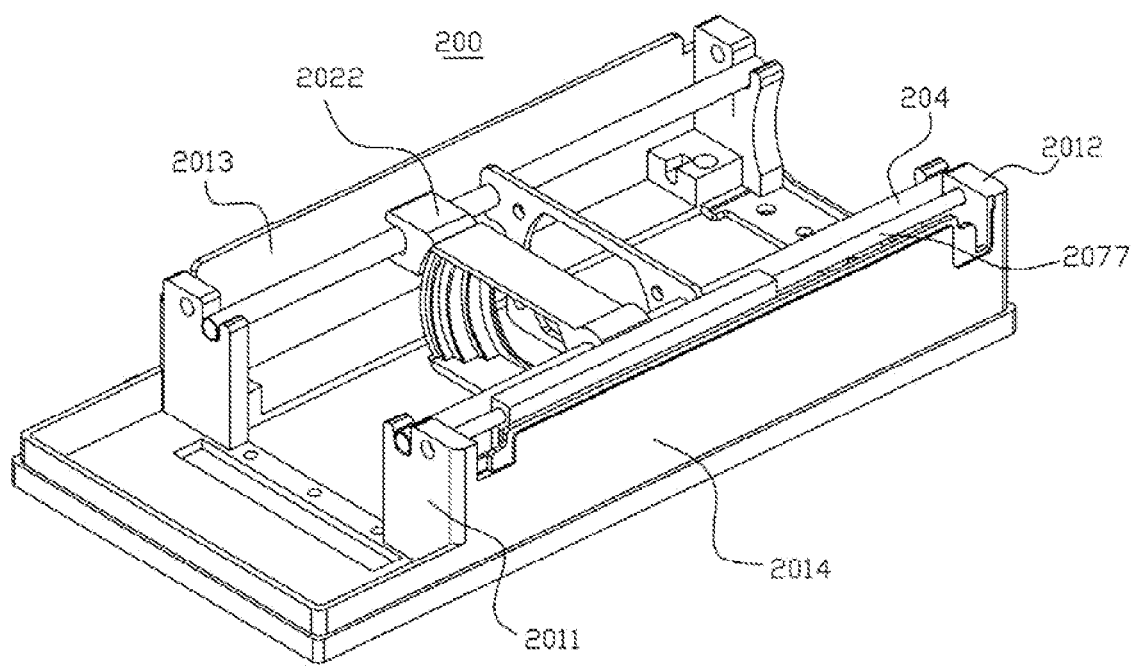
FIG. 10 is a schematic view showing the structure of the base and the second lens group of the lens device in accordance with the second embodiment of the invention.

FIG. 8 is a schematic view showing the structure of the lens device 200 in accordance with the second embodiment of the invention. FIG. 9 is an exploded schematic view of the lens device 200 in accordance with the second embodiment of the invention. FIG. 10 is a schematic view showing the structure of the base 201 and the second lens group 2022 of the lens device 200 in accordance with the second embodiment of the invention. For simplification, the elements same as or similar to those of the first embodiment are indicated by the same reference numerals and the descriptions thereof are omitted in the following.

The lens device 200 includes two positioning elements, dragging elements and counterweight blocks. The positioning elements are spaced in the first direction X and fixed to the base 201. The dragging elements are disposed around the positioning elements. The mass of the counterweight block is equal to that of the movable lens group. The dragging element is connected to the movable lens group and the counterweight block, wherein the movable lens group and the counterweight block are disposed at two sides of the dragging element.

The first positioning element 2071 is disposed near one of the third side wall 2013 and the fourth side wall 2014 of the base 101. The second lens group 2022 is connected to the first dragging element 2072. The first counterweight block 2073 and the second lens group 2022 are respectively connected to the two sides of the first dragging elements 2072.

The second embodiment differs from the first embodiment in that the first magnet 2051 or the first coil 2052 is fixed to the first counterweight block 2073. To guarantee an effective interaction between the first magnet (not shown, by reference to the second magnet 2053 instead) and the first coil 2052, the first counterweight block 2073 is disposed near the one of the third side wall 2013 and the fourth side wall 2014 (in figures, the first counterweight block 2073 is disposed near the fourth side wall 2014), and the first counterweight block 2073 and the one of the third side wall 2013 and the fourth side wall 2014 face each other. Also, the first counterweight block 2073 is disposed between the second lens group 2022 and the one of the third side wall 2013 and the fourth side wall 2014.

In the embodiment depicted by figures, the first counterweight block 2073 is substantially flat and has a concave portion at the middle. The concave portion is straight, extends in the first direction X, and has the first magnet fixed thereto. The first counterweight block 2073 may be in another shape, for example, in a shape similar to that of the first embodiment. It is understood that the first counterweight block 2073 may be replaced with the first magnet 2051. That is, the first magnet 2051 functions as the first counterweight block 2073 wherein the mass of the first magnet 2051 is equal to that of the second lens group 2022. In other words, the magnet has no concave portion formed thereon and the whole magnet is used to function as a counterweight block.

To guarantee stability of the movement, a second guiding unit 2077 is arranged in the first direction X and on the base 201. In the embodiment depicted by figures, the second guiding unit 2077 includes two guiding rods connected between the first side wall 2011 and the second side wall 2012. Both of the guiding rods 2077 are disposed close to the one of the third side wall 2013 and the fourth side wall 2014. Further, the guiding rods 2077 are penetrated through the upper portion and the lower portion of the first counterweight block 2073, and the first counterweight block 2073 is slidable on the guiding rods 2077.

If the second lens group 2022 has the first counterweight block 2073 and the second guiding unit 2077 disposed at both sides, then the first guiding unit 204 of the second lens group 2022 can be omitted. However, the invention is not limited thereto. For example, movement of the first counterweight block 2073 in the first direction X can be performed by way of the second guiding unit 2077, and the movement of the second lens group 2022 in the first direction X can be still performed by way of the first guiding unit 204 thereof.

In this embodiment, the first counterweight block 2073 has the first magnet 2051 or the first coil 2052 fixed thereto. The entire mass is large. Therefore, the first counterweight block 2073 may be made of metal, plastic or the like.

When power is supplied to the first coil 2052, the first coil 2052 interacts with the first magnet 2051 to move the first counterweight block 2073 in the first direction X. The first counterweight block 2073 is connected to the second lens group 2022 through the first dragging element 2072. Therefore, the second lens group 2022 is moved in a direction opposite to the first direction X when the first counterweight block 2073 is moved in the first direction X.

The arrangement and operation of the third lens group 2023 are similar to those of the second lens group 2022 and therefore the descriptions thereof are omitted.

When moving to the predetermined location, the movable lens group stops. Power supplied to the corresponding coil is cut off so that the electromagnetic force applied to the movable lens group disappears. The counterweight block and the movable lens group sustain pulling forces from each other through the dragging element, and the pulling forces are equal to the gravity of the counterweight block and the gravity of the movable lens group. Therefore, the movable lens group is kept stationary without falling down because of the equilibrium of the pulling force and the gravity, even when the lens device is placed vertically. Because continuously supplying power to the movable lens group is not required, power consumption is significantly reduced.

If the mass of the counterweight block is not equal to that of the movable lens group, then the equilibrium of the pulling force and the gravity can be still achieved by less electromagnetic force generated by the coil and the magnet because the counterweight block under the gravity keeps pulling the movable lens group. That is, supplying power to the coil to totally counter the gravity of the movable lens group is not required. Therefore, power consumption can be still significantly reduced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens device, comprising:
   a base;
   a lens module disposed in the base and comprising at least one movable lens group that is movable in a first direction;
   a driving device configured to drive the movable lens group to move;
   a plurality of positioning elements spaced in the first direction and fixed to the base;
   a dragging element put around the positioning elements; and
   a counterweight block;
   wherein the counterweight block and the movable lens group are connected to the dragging element;
   wherein the base comprises a side wall;
   wherein the driving device comprises a magnet and a coil;
   wherein the magnet is fixed to one of the movable lens group and the side wall of the base, and the coil is fixed to the other of the movable lens group and the side wall of the base.

2. The lens device as claimed in claim 1, further comprising a guiding unit, wherein the guiding unit is disposed on the base in the first direction to guide at least one of the movable lens group and the counterweight block.

3. The lens device as claimed in claim 2, wherein the guiding unit comprises first guiding units connected to both sides of the base, and the movable lens group is configured to operate with the first guiding units so as to slide.

4. The lens device as claimed in claim 1, wherein:
   the movable lens group comprises a connecting portion;
   the magnet or the coil is fixed to the connecting portion;
   the connecting portion and the side wall of the base are close to and face each other;
   the connecting portion is disposed between the counterweight block and the side wall.

5. The lens device as claimed in claim 4, wherein the movable lens group is fixed to the dragging element through the connecting portion, and the movable lens group and the counterweight block are connected to both sides of the dragging element.

6. The lens device as claimed in claim 4, wherein the connecting portion is flat.

7. The lens device as claimed in claim 4, wherein the connecting portion comprises a first portion and a second portion, the first portion is connected to a side surface of the movable lens group, and the second portion extends from the first portion towards the side wall of the base.

8. The lens device as claimed in claim 1, wherein: when the magnet is fixed to the sidewall of the base, the coil is fixed to the counterweight block.

9. The lens device as claimed in claim 8, further comprising:
   a guiding unit;
   wherein the guiding unit comprises a second guiding unit connected to a side of the base;
   wherein the second guiding unit is penetrated through the counterweight block; and wherein the counterweight block is slidable on the second guiding unit.

10. The lens device as claimed in claim 8, wherein the counterweight block and the side wall of the base are close to and face each other, and the counterweight block is disposed between the movable lens group and the side wall.

11. The lens device as claimed in claim 8, wherein:
the counterweight block comprises a concave portion to which the coil or the magnet is fixed;
the concave portion extends in the first direction.

12. The lens device as claimed in claim 8, wherein the counterweight block itself is the coil or the counterweight block itself is the magnet.

13. The lens device as claimed in claim 1, wherein:
the lens module comprises at least two adjacent movable lens groups;
the counterweight blocks corresponding to the adjacent movable lens groups are disposed on both sides of the base.

14. The lens device as claimed in claim 1, wherein the positioning element is a positioning post and the dragging element is a pulling string, or the positioning element is a belt wheel and the dragging element is a belt, or the positioning element is a gear and the dragging element is a chain.

15. The lens device as claimed in claim 1, wherein a mass of the movable lens group is equal to that of the counterweight block.

16. A lens device comprising:
a base;
a lens module disposed in the base and comprising at least one movable lens group that is movable in a first direction;
a driving device configured to drive the movable lens group to move;
a plurality of positioning elements spaced in the first direction and fixed to the base;
a dragging element put around the positioning elements; and
a counterweight block;
wherein the counterweight block and the movable lens group are connected to the dragging element;
wherein the base comprises a side wall;
wherein the driving device comprises a magnet and a coil;
wherein the magnet is fixed to one of the counterweight block and the side wall of the base, and the coil is fixed to the other of the counterweight block and the side wall of the base.

17. The lens device as claimed in claim 16, wherein:
the guiding unit comprises a second guiding unit connected to a side of the base;
the second guiding unit is penetrated through the counterweight block; and
the counterweight block is slidable on the second guiding unit.

18. The lens device as claimed in claim 16, wherein the counterweight block and the side wall of the base are close to and face each other, and the counterweight block is disposed between the movable lens group and the side wall.

19. The lens device as claimed in claim 16, wherein:
the counterweight block comprises a concave portion to which the coil or the magnet is fixed;
the concave portion extends in the first direction;
the counterweight block itself is the coil or the counterweight block itself is the magnet.

* * * * *